No. 741,941. PATENTED OCT. 20, 1903.
H. B. SMITH.
NUT LOCK.
APPLICATION FILED JULY 10, 1903.
NO MODEL.
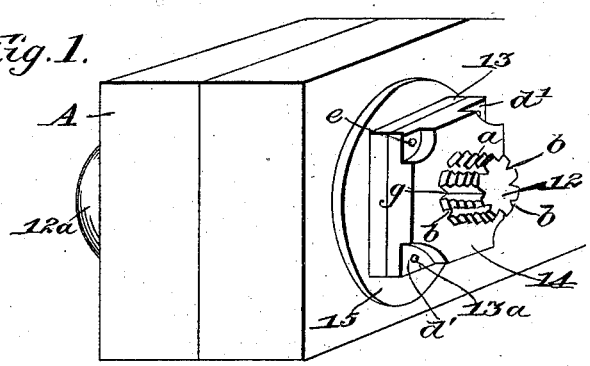
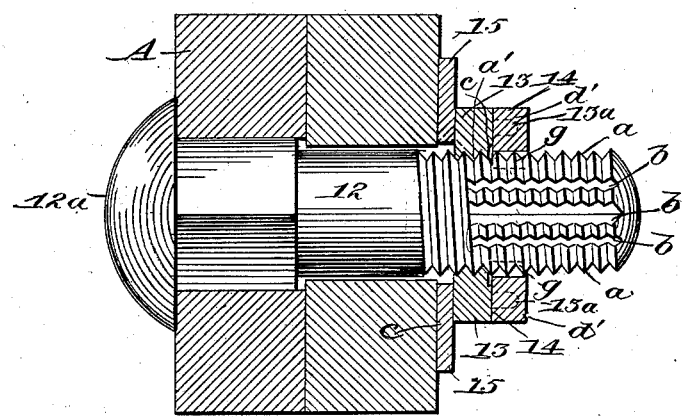
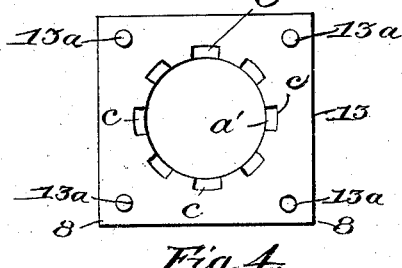
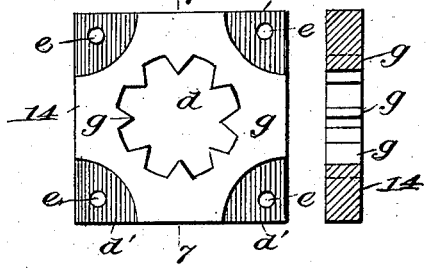
Witnesses
Inventor
Herman B. Smith
THE NORRIS PETERS CO., PHOTO-LITHO., WASHINGTON, D. C.

No. 741,941.

Patented October 20, 1903.

UNITED STATES PATENT OFFICE.

HERMAN B. SMITH, OF FALLS VILLAGE, CONNECTICUT.

NUT-LOCK.

SPECIFICATION forming part of Letters Patent No. 741,941, dated October 20, 1903.

Application filed July 10, 1903. Serial No. 165,030. (No model.)

*To all whom it may concern:*

Be it known that I, HERMAN B. SMITH, a citizen of the United States, and a resident of Falls Village, in the county of Litchfield and State of Connecticut, have invented a new and Improved Nut-Lock, of which the following is a full, clear, and exact description.

The object of this invention is to provide a nut-lock of novel simple construction which is practical and effective in service, convenient in application, and that may be produced in quantity at a low cost.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of the improved nut-lock applied. Fig. 2 is a transverse sectional view of the complete nut and lock means therefor mounted on a screw-cut bolt and adjusted thereon to hold the nut on the bolt from turning after adjustment thereon to clamp material through which the body of the bolt is inserted. Fig. 3 is a plan view of the nut, showing details of the invention thereon. Fig. 4 is the end view of Fig. 3 substantially on the line 8 8 in Fig. 3. Fig. 5 is a detached plan view of a lock-plate for the nut proper embodying features of the invention. Fig. 6 is a transverse sectional view of the lock-plate substantially on the line 7 7 in Fig. 5.

The nut-locking device of my invention may be employed to retain a nut from turning on a bolt or threaded clamping-stud used for any purpose where it is essential that the nut shall remain as adjusted on the thread of the bolt. The bolt-body 12 may be angular at and near the head $12^a$, so as to prevent turning of the bolt in material—such as A, for example—and the head may be convexed on the outer end, as shown, or be of any other shape preferred. Upon the opposite end of the bolt-body, which is cylindrical, a thread $a$ of suitable pitch and gage is formed, extending toward the head for the reception of the nut that is to clamp upon the material A. The nut proper (indicated by the reference character 13) is formed threaded in its defining-wall, as at $a'$, to screw upon the bolt-body 12.

In the threaded body of the bolt 12 a plurality of shallow grooves $b$ are formed at equal distances apart, said grooves extending from the end of the bolt of a proper length, as indicated in Figs. 1 and 2, and in the end of the nut-block 13 a series of shallow indents $c$ is formed around the threaded opening therein which are evenly spaced apart and are equal in number with the longitudinal grooves $b$, these indents appearing in Fig. 3. The disposal of the indents $c$ is such that registry of the same with the grooves $b$ upon the threaded portion of the nut will dispose the studs $13^a$ in such a position that the openings $e$ upon the lock-plate 14 will correspondingly register in relative disposition with the aforesaid studs $13^a$ and facilitate the locking engagement of the nut with the locking-plate. The lock-plate 14, constituting the locking member for the nut 13, is preferably rectangular and of equal dimensions with the nut-block and has a central circular aperture $d$. In the aperture $d$, which in its circular wall is of a diameter to freely receive the threaded body of the bolt 12, a series of evenly-spaced locking-ribs $g$ is formed that extend therein a proper distance. As shown, said ribs equal in length the thickness of the lock-plate 14.

The number of the ribs $g$ equals that of the grooves $b$ in the threaded portion of the bolt 12 and, being similarly spaced apart and of a size that will permit said ribs to slide into the grooves $b$ when the lock-plate 14 is pressed endwise upon the free end of the bolt and the ribs $g$, are registered with the grooves $b$.

Upon the outer face of the lock-plate 14 a depression $d'$ is formed at each corner, and a perforation $e$ is formed in each of said depressions. From each corner of the nut-block 13 a rivet-stud $13^a$ projects, these rivet-studs being affixed to the nut at such points as will permit them to be respectively inserted through the perforation $e$.

When the bolt 12 is applied for connection of material A, (shown to illustrate one use of the lock-nut,) one or more washers 15 may be placed thereon before the nut 13 is screwed upon the thread $a$ of the bolt. The nut 13 when mounted upon the projecting threaded end of the bolt-body 12 and screwed thereon, so as to contact with the material A or the washer 15, if the latter is employed, should be so relatively positioned as to dispose the depressions $c$ opposite the grooves $a$ in the body of bolt 12 when the nut is drawn tight. The relative position of the ribs $g$ in the aperture $d$ with regard to the indents $c$ is such that when the lock-plate 14 is engaged with the rivet-studs $13^a$ the ribs $g$ will freely slide into the grooves $b$ in the bolt 12.

Obviously if the ribs $g$ are entered in the grooves $a$ the nut 13 will be held from unscrewing, and if the lock-plate is secured on the rivet-studs $13^a$ by riveting thereto the ends of the rivet-studs that project into the depressions $d'$ the lock-plate 14 will be held securely on the bolt-body in engagement with the bolt and nut. The use of one or more washers 15 may be necessary to properly dispose the rivet-studs $13^a$ with regard to the grooves $b$ in the bolt 12 so that the lock-plate 14 may be mounted on the rivet-studs, as described.

Having thus described my invention, I claim as new and desire to secure by Letters Patent—

1. The combination with a bolt, of a nut adapted to be screwed thereon, a lock-plate for coöperation with the said nut to positively secure the same to the bolt, interlocking means between the aforesaid plate and nut, and independent indicating means for facilitating the engagement of the aforesaid interlocking means.

2. The combination with a bolt, provided with longitudinal grooves upon the threaded portion thereof, a nut, a lock-plate disposed upon the bolt adjacent the nut, interlocking elements carried by the nut and lock-plate, interlocking means between the lock-plate and the grooves upon the threaded portion of the bolt, and independent indicating means consisting of indents disposed upon the nut and adapted to register with the grooves upon the bolt whereby the engagement of the interlocking means upon the nut and lock-plate is facilitated.

3. The combination with a bolt having evenly-spaced longitudinal grooves in its thread, of a lock-nut, comprising a nut having four sides, a threaded central aperture therein, and a rivet-stud at each corner, all projected from the same face of the nut, a lock-plate having a like peripheral form to that of the nut, and a depression at each corner on the outer face thereof, each corner having a transverse perforation adapted to receive a corresponding rivet-stud, the lock-plate being centrally and circularly apertured to slide on the bolt, and provided with a series of evenly-spaced locking-ribs corresponding in number to that of the grooves in the bolt, which ribs may enter said grooves and lock the nut on the bolt when the rivet-studs are secured in the perforations in the lock-plate.

In testimony whereof I have signed my name to this specification in the presence of two subscribing witnesses.

HERMAN B. SMITH.

Witnesses:
J. LEE ENSIGN,
WILLIAM R. HUBBELL.